United States Patent
Huddleston et al.

(10) Patent No.: US 11,425,232 B2
(45) Date of Patent: Aug. 23, 2022

(54) FAULTY DISTRIBUTED SYSTEM COMPONENT IDENTIFICATION

(71) Applicant: MORGAN STANLEY SERVICES GROUP INC., New York, NY (US)

(72) Inventors: Richard Huddleston, Jericho, NY (US); Ahmed Jedda, Montreal (CA)

(73) Assignee: Morgan Stanley Services Group Inc., New York, NY (US)

(*) Notice: Subject to any disclaimer, the term of this patent is extended or adjusted under 35 U.S.C. 154(b) by 219 days.

(21) Appl. No.: 17/012,314

(22) Filed: Sep. 4, 2020

(65) Prior Publication Data
US 2020/0404084 A1 Dec. 24, 2020

Related U.S. Application Data

(63) Continuation of application No. 16/110,965, filed on Aug. 23, 2018, now Pat. No. 10,798,230.

(51) Int. Cl.
| | |
|---|---|
| *H04L 69/40* | (2022.01) |
| *G06F 11/07* | (2006.01) |
| *H04L 45/00* | (2022.01) |
| *G06N 3/04* | (2006.01) |
| *H04L 49/90* | (2022.01) |
| *H04L 41/0654* | (2022.01) |

(52) U.S. Cl.
CPC .......... *H04L 69/40* (2013.01); *G06F 11/0709* (2013.01); *G06N 3/049* (2013.01); *H04L 45/70* (2013.01); *H04L 49/90* (2013.01); *H04L 41/0654* (2013.01)

(58) Field of Classification Search
None
See application file for complete search history.

(56) References Cited

U.S. PATENT DOCUMENTS

| | | | | |
|---|---|---|---|---|
| 8,102,783 | B1* | 1/2012 | Narayanaswamy | .... H04L 43/18 709/224 |
| 8,116,307 | B1* | 2/2012 | Thesayi | ................ H04L 63/306 709/227 |
| 8,537,818 | B1* | 9/2013 | Thesayi | ................... H04L 69/22 709/227 |
| 8,619,614 | B2* | 12/2013 | Narayanaswamy | .... H04L 43/18 370/428 |
| 10,142,353 | B2* | 11/2018 | Yadav | ................... H04L 63/0227 |
| 10,169,816 | B2* | 1/2019 | Damodaran | ........... G06Q 40/04 |
| 10,360,069 | B2* | 7/2019 | Bequet | .................... H04L 67/12 |
| 10,552,728 | B2* | 2/2020 | Oliner | ................. G06F 16/2453 |
| 10,699,705 | B2* | 6/2020 | Li | ........................ G10L 21/0316 |

(Continued)

*Primary Examiner* — Ayaz R Sheikh
*Assistant Examiner* — Faiyazkhan Ghafoerkhan
(74) *Attorney, Agent, or Firm* — Weitzman Law Offices, LLC (57) ABSTRACT

A system for detecting a communications computer network node malfunction by analysis of network traffic output by the network node. Low latency packet capture nodes copy network traffic and transmit it to an analytics engine, which may use machine learning techniques, including long short-term memory (LSTM) neural networks, to determine a likelihood that the output of one data router in a network is suffering from a software malfunction, hardware malfunction, or network connectivity issue, and preserve overall data quality in the network by causing cessation of traffic by the malfunctioning node of the network.

20 Claims, 7 Drawing Sheets

(56) References Cited

U.S. PATENT DOCUMENTS

| | | | |
|---|---|---|---|
| 10,798,230 B2* | 10/2020 | Huddleston | G06F 11/0751 |
| 11,159,022 B2* | 10/2021 | Lee | G05B 13/048 |
| 11,163,271 B2* | 11/2021 | Lee | H02J 7/35 |
| 11,211,060 B2* | 12/2021 | Li | G06N 3/0445 |
| 2001/0055274 A1* | 12/2001 | Hegge | H04L 47/10 370/423 |
| 2005/0025051 A1* | 2/2005 | Roeder | H04L 61/00 370/230 |
| 2006/0182034 A1* | 8/2006 | Klinker | H04L 45/3065 370/248 |
| 2012/0113857 A1* | 5/2012 | Narayanaswamy | H04L 43/18 370/252 |
| 2014/0075041 A1* | 3/2014 | Keesara | H04L 49/20 709/231 |
| 2015/0185716 A1* | 7/2015 | Wichmann | F02C 9/28 700/287 |
| 2016/0063628 A1 | 3/2016 | Kreider et al. | |
| 2016/0196606 A1 | 7/2016 | Damodaran et al. | |
| 2016/0299938 A1* | 10/2016 | Malhotra | G06N 3/0445 |
| 2016/0359872 A1* | 12/2016 | Yadav | H04L 63/20 |
| 2017/0099309 A1* | 4/2017 | Di Pietro | H04L 63/1425 |
| 2017/0251246 A1* | 8/2017 | Hua | H04N 21/632 |
| 2017/0339022 A1 | 11/2017 | Hegde et al. | |
| 2018/0032862 A1* | 2/2018 | Oliner | G06F 40/274 |
| 2018/0091387 A1* | 3/2018 | Levi | H04L 43/028 |
| 2018/0091388 A1* | 3/2018 | Levy | H04L 43/12 |
| 2018/0096107 A1* | 4/2018 | Demestichas | G16H 50/70 |
| 2018/0109589 A1* | 4/2018 | Ozaki | G16H 50/20 |
| 2019/0081959 A1* | 3/2019 | Yadav | H04L 63/02 |
| 2019/0130486 A1* | 5/2019 | Damodaran | G06Q 40/06 |
| 2019/0188065 A1* | 6/2019 | Anghel | G06F 11/0778 |
| 2019/0349316 A1* | 11/2019 | Yuan | H04L 49/208 |
| 2019/0392823 A1* | 12/2019 | Li | G06N 3/0445 |
| 2020/0065213 A1* | 2/2020 | Poghosyan | G06F 11/3452 |
| 2020/0068052 A1* | 2/2020 | Huddleston | G06N 3/049 |
| 2020/0090027 A1* | 3/2020 | Oliner | G06N 3/0445 |
| 2020/0294495 A1* | 9/2020 | Li | G06N 3/08 |
| 2020/0404084 A1* | 12/2020 | Huddleston | G06F 11/0709 |

\* cited by examiner (PRIOR ART)

FAULTY DISTRIBUTED SYSTEM COMPONENT IDENTIFICATION

CROSS REFERENCE TO RELATED APPLICATIONS

This application is a continuation of co-pending U.S. patent application Ser. No. 16/110,965, filed Aug. 23, 2018 and also titled "FAULTY DISTRIBUTED SYSTEM COMPONENT IDENTIFICATION," which is hereby incorporated by reference in its entirety.

FIELD OF INVENTION

This disclosure relates to systems and methods for ensuring network integrity and functionality, and more specifically, to identifying and addressing anomalous activity by nodes and routers in an electronic communications network.

BACKGROUND

In numerous types of computer network, various actors or computing devices at opposite ends of the network rely on various intermediate routers to accurately retransmit and route received data packets to an appropriate destination. In some networks, the routers may additionally be tasked with aggregating, modifying, or filtering the received data before forwarding to the data's final destination.

A software or hardware fault in one of these data routers can lead to significant adverse effects for those relying on the integrity of the data being transmitted. For example, a meteorological data router may report that conditions are safe when in fact a tornado is forming nearby, due to repeating old wind speed data that it believes was not received and acknowledged, and failing to transmit new data until the old data in queue has been confirmed as sent. A high-frequency stock order router can cause millions of dollars in damage and even trigger a panic or sell-off if it erroneously transmits incorrect information and the markets fulfill incorrect sale offers or react to the offers apparently made by one market participant. A mission-critical website may be shut down by a denial-of-service attack if a firewall or other filter erroneously lets traffic through to a central server that should have been filtered out.

As a result, there is value in being able to quickly identify and address any node in a computer network that is not faithfully and accurately passing on or processing the data received by the node and which is acted upon at a destination trusting the accuracy of that data.

SUMMARY

In accordance with one aspect of this disclosure, a system for detecting a communications network node malfunction is disclosed, comprising one or more low-latency packet monitors, each placed between a data router and a central repository, and a data analytics engine. The low-latency packet monitors are configured to receive and forward a first data stream directed from the data router and to the central repository, wherein the data router is configured to generate the first data stream as a copy of a selected subset of a second data stream. The data analytics engine is configured to receive, from the one or more low-latency packet monitors, a copy of the first data stream; determine, based on the received copy of the first data stream, a likelihood that the first data stream comprises a corruption of the second data stream due to software or hardware failure in a data router; and responsive to a determination that likelihood of corruption exceeds a predetermined threshold, transmit an electronic message to cause a cessation of the corruption in the second data stream.

In accordance with another aspect of this disclosure, a computer-implemented method for detecting a communications network node malfunction, comprising receiving, from one or more low-latency packet monitors, a copy of a first data stream generated by a data router as a copy of a selected subset of a second data stream and directed to a central repository; determining, based on the received copy of the first data stream, a likelihood that the first data stream comprises a corruption of the second data stream due to software or hardware failure in a data router; and responsive to a determination that likelihood of corruption exceeds a predetermined threshold, transmitting an electronic message to cause a cessation of the corruption in the second data stream.

In accordance with another aspect of this disclosure, a computer-implemented method for detecting a communications network node malfunction is disclosed, comprising receiving and inputting into an LSTM neural network sequential time windows of data from a first data stream output by the communications network node; determining, after each time window, a probability that a presently-received time window of data from the first data stream represented an accurate copy of a subset from a second data stream, based on previously received time windows of data from the first data stream and on historical information from the second data stream; and responsive to a determining that the probability exceeds a predetermined threshold, transmitting an electronic message to the communications network node to modify output of the communications network node and prevent any output of data by the communications network node that is not an accurate copy of a subset from a second data stream. The modifying the output of the communications network node may involve preventing receiving from a subset of sources of the second data stream or preventing transmission to a subset of destinations of the first data stream by the communications network node.

DETAILED DESCRIPTION

Figure 1:
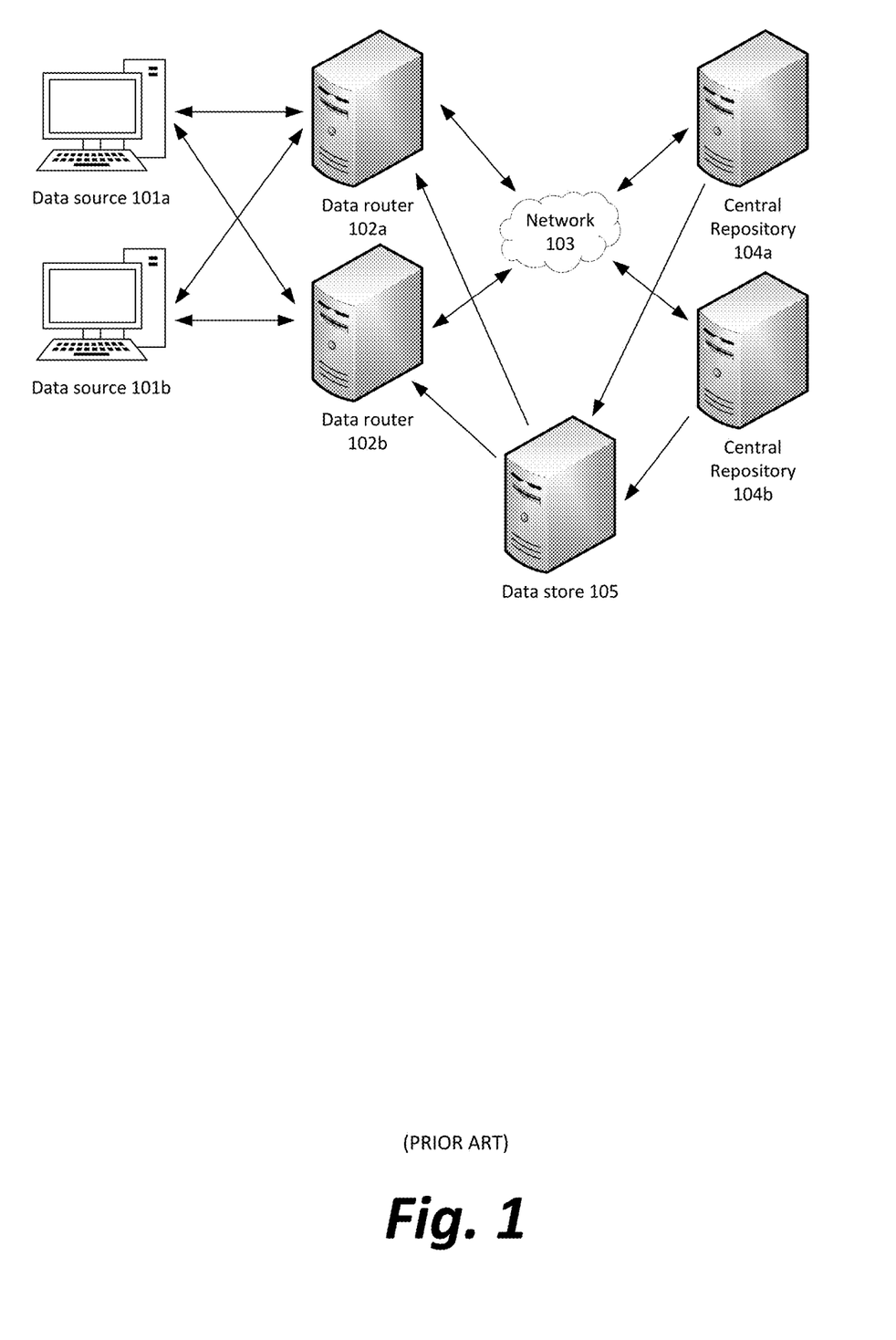
FIG. 1 illustrates, in simplified form, a prior art communications network.
Figure 2:
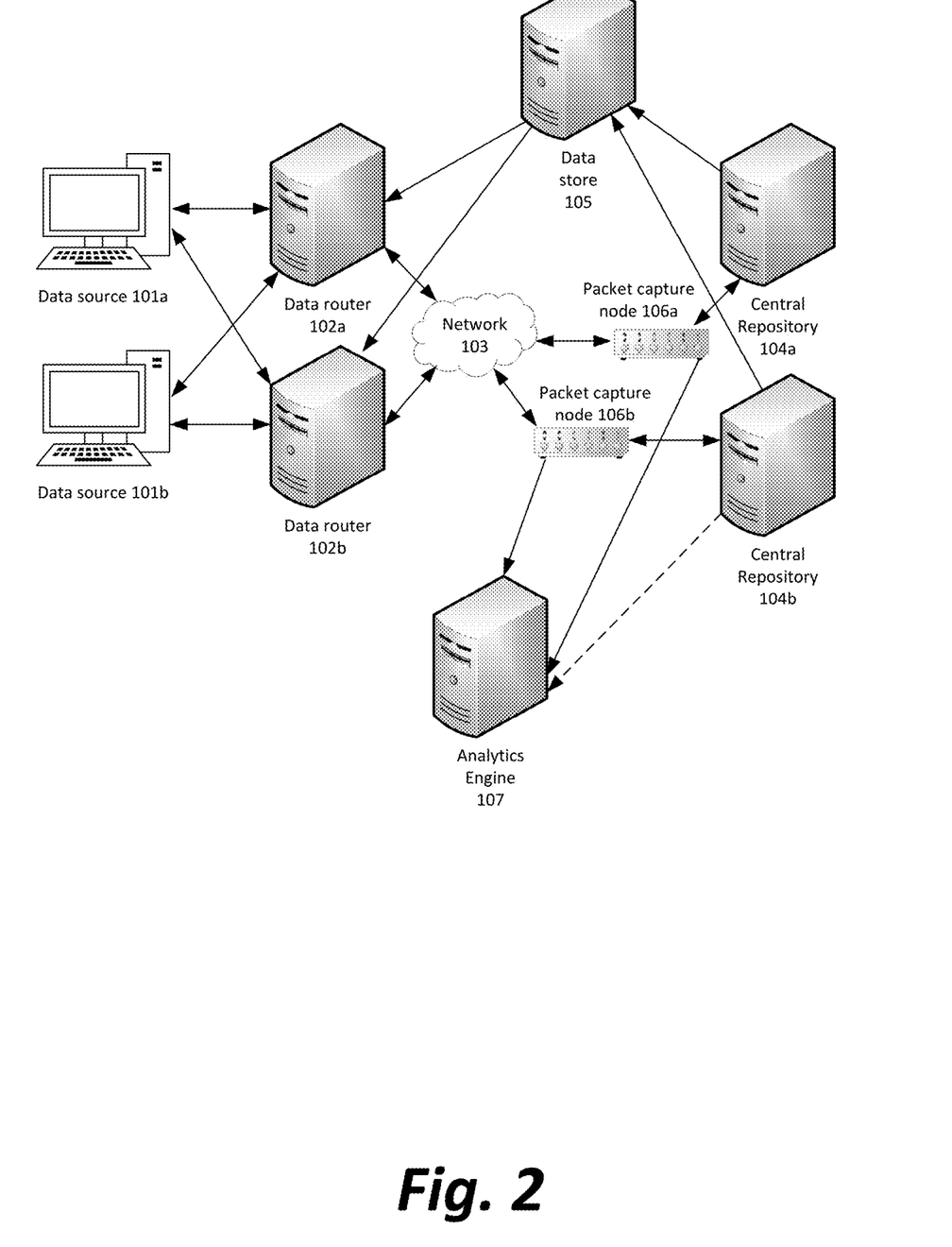
FIG. 2 illustrates, in simplified form, a communications network capable of use in the system and methods disclosed herein.

The danger highlighted above of a network node contaminating data quality and causing physical damage, technological failure, or financial damage due to software or hardware malfunction in a computer network such as the network illustrated in FIG. 1 may be addressed by a system for network performance monitoring and evaluation illustrated in FIG. 2 and the following figures.

With reference now to FIG. 1, a network may include a number of data origins 101a, 101b, etc., which pass data to at least one data router from a set of data routers 102a, 102b, etc. The arrows in FIG. 1 are used to show data transmissions that are bidirectional or unidirectional, as shown by the directions indicated by the arrows. Each data router 102 may then pass the data to one or more central repositories 104a, 104b, etc. either directly or by means of intermediate routers and/or computer network 103. Intermediate routers and/or computer network 103 may actually represent either a single network or a set of disjoint networks; although, as illustrated in FIG. 1, there appears to be interconnectivity between each of the routers 102 and the repositories 104, there could be multiple, parallel connections between one router 102 and one repository 104, without any cross connections.

In some embodiments, a data store 105 may receive information from the central repositories 104a-104n and feed additional information to data router 102, the additional information being considered at data router 102 in modifying the received data from data origins 101a-101n before passing it on to central repositories 104, or in deciding to which central repository of several the data should be sent.

In an example embodiment, data origins 101a-101n could be computing devices associated with stock brokers, central repositories 104a-104n could be stock exchanges, each data router 102 could be a router configured to determine how to divide or allocate asset purchase and sell orders between multiple exchanges to fulfill the orders, and data store 105 may be a database tracking asset prices and offers in real time to inform the data router whether a given transaction at a given price is possible.

In another embodiment, data origins 101a-101n could be meteorological sensors with limited communications range, each data router 102 could be a receiver, collator, and re-transmitter of the meteorological data, and a central repository 104a-104n could be a national weather service or a computing device associated with a weatherperson.

In a third example embodiment, data origins 101a-101n could be electronic voting machines during an election, a central repository 104a-104n could be a computing device associated with a department of state or a local elections board, and each data router 102 could be a node for aggregating total votes for each candidate at a given precinct before transmitting for inclusion in the final vote tally over an entire constituency.

In a fourth example embodiment, data origins 101a-101n could be individual consumers' computing devices, central repositories 104a-104n could be servers of websites and other files, each data router 102 could be tasked with load balancing incoming HTTP (hypertext transfer protocol) and FTP (file transfer protocol) requests between the central repositories or preventing them from receiving a denial-of-service attack, and data store 105 could track the current utilization of each central repository 104a-104n or a running total number of requests from each data origin 101a-101n to inform how a particular request ought to be forwarded or if it should be treated as an attempted denial of service.

FIG. 2 illustrates, in simplified form, a communications network capable of use in the system and methods disclosed herein.

With reference now to FIG. 2, one or more packet capture nodes 106a, 106b, . . . 106n may be added to the network described in FIG. 1 between the data routers 102a-102n and the one or more central repositories 104. The packet capture nodes 106 may be low-latency network repeaters that simultaneously pass the data unchanged to the central repositories 104a-104n as well as passing a copy of the data to an analytics engine device 107.

The analytics engine 107 may be configured to process the data passing to the central repositories 104a-104n and determine whether a software or hardware fault in a data router 102 may have caused a corruption in the data output, for what should have been a single transmission to have been repeated multiple times, for data transmissions to be originated at a data router 102 which were not based on transmissions from any data origin 101, for a transmission meant for sending to a single central repository 104 to be sent to multiple central repositories instead, or other unintended data transmissions within the network. Analytics engine 107 may also be connected to and receive data directly from one or more of the central repositories 104a-104n.

Figure 3:
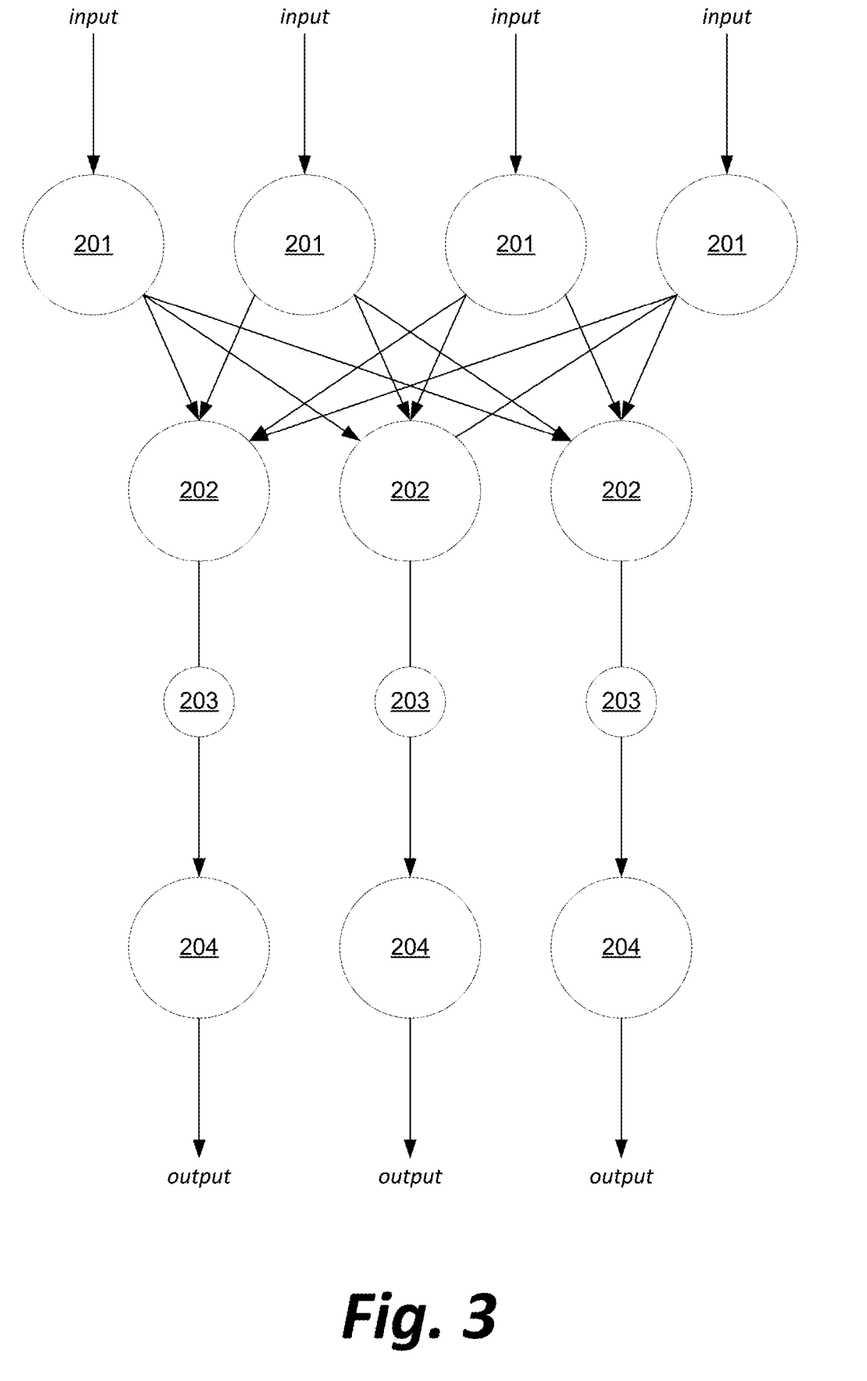
FIG. 3 illustrates, in simplified form, an abstract representation of a communications network model for use with the system and methods disclosed herein.

FIG. 3 illustrates, in simplified form, an abstract representation of a communications network model for use with the system and methods disclosed herein.

With reference now to FIG. 3, input data may be received from various sources at, or generated by, a series of entry nodes 201. The input data may be, depending on the application of the system, sensor data (e.g., audio, video, temperature, position, movement, vibration, humidity, pressure, etc.), input based on human generated data (e.g., ballots, purchase orders, HTTP requests, communications such as emails or text messages, etc.), or other structured data.

Each entry node 201 may be interconnected with each of a plurality of router nodes 202 tasked with the purpose of passing data to one of a plurality of destination nodes 204. The destination nodes 204 may either forward output data based on the received input data, or act upon the data in some way such as activating a function of a device or transmitting an acknowledgement. Between the router nodes 202 and destination nodes 204 may be inserted a plurality of capture nodes 203, configured to receive, record, and forward without change the data transmitted by the router nodes 202.

The entry nodes 201 may correspond to the data origins 101 in FIGS. 1 and 2, the router nodes 202 may correspond to the data routers 102 in FIGS. 1 and 2, the destination nodes 204 may correspond to the central repositories 104 in FIGS. 1 and 2, and the capture nodes 203 may correspond to the packet capture nodes 106 in FIG. 2.

The division of data from data origins 201 to multiple data routers 202 may be done for purposes of load balancing, so that all data routers 202 remain as low-latency as possible. The division may also be performed as a necessity if a particular data transmission needs to be passed to a particular destination node 204 that can uniquely process or receive the data transmission, and a particular data router 202 is the only router coupled to that destination node. Finally, the division may be used to arbitrarily assign data transmission types to particular data routers 202, so that data transmission types are sorted by a means that does not reflect the underlying data, such as the output of a hash function or other identifier.

The decision of which data router 202 will process a particular data transmission from a data origin 201 may, in some embodiments, be made by software on the data origin 201 itself, such as a load balancer that takes into account input from each data router 202 indicating the data router's current utilization, or that randomly selects a data router 202 for each transmission. In other embodiments, the data origins 201 may be agnostic regarding the topology of the downstream network, and the decision may be made by each of the data routers 202, which receive a broadcast from a data origin 201 and use a quality of the transmission to decide whether a given data router is intended to handle the transmission (e.g., a router that hears all weather reports but only forwards ones from a particular region, or a router that hears all stock orders, but only processes ones regarding stock symbols beginning with "Z").

The network between the router nodes 202 and the destination nodes 204 may be a simple series of direct parallel connections, or may instead be a more complex, interconnected network of unknown topology, including possibly the Internet. In a preferred embodiment, the capture nodes 203 should be placed immediately downstream from the router nodes 202 such that each capture node is capturing data from a single router node as soon as possible after it is sent, to detect an anomaly in the output from the router node suggesting a malfunction in the router node or in an entry node 201 from which the router node is receiving data. In other embodiments, the capture node 203 may be placed somewhere else between a router node 202 and a destination node 204, so long it captures the data passed between the nodes.

In some embodiments, the capture nodes 203 may serve both a capture function and an analysis function (for example, in a situation where it is critical to identify a data anomaly as quickly as possible, even if the extra processing delays the forwarding of the data to the destination nodes 204), while in others, the capture nodes may forward the data both to the destination nodes 204 and to a separate device for analysis (for example, in a situation where low-latency data transmission is critical and the delay in anomaly detection from forwarding to a separate device is acceptable).

If the capture nodes 203 perform an analytical function instead of blindly forwarding the data as a low-latency packet repeater, they may be used to generate a probability distribution of a given data input occurring.

For example, a system transferring weather report data may, over time and using observations that are presumed to be accurate, determine that a given time of day during a given time of year has a certain baseline probability distribution for each of temperature, precipitation, and wind speed. This baseline probability distribution may be compared to the currently observed data to determine how unlikely it is that a true weather observation would return the currently reported values, and potentially trigger a notice to investigate or shut down the system if the unlikelihood passes a certain probability threshold.

Similarly, in another embodiment, a system reviewing output from a stock order router could determine a strong covariance or inverse variance typically exists between changes in price or frequency trading of two assets, such as two technology-related stocks that are likely to rise or fall together, or complementary assets like a precious metal bullion and a national currency, where a decrease in value of one asset is likely to cause a rush to buy and increase the price of the other asset.

By using a plurality of capture nodes, each processing a specific subset of similar data, probability distributions may be refined over time on a per node basis to be more specific and more sensitive to an input data state that seems particularly improbable.

Figure 4:
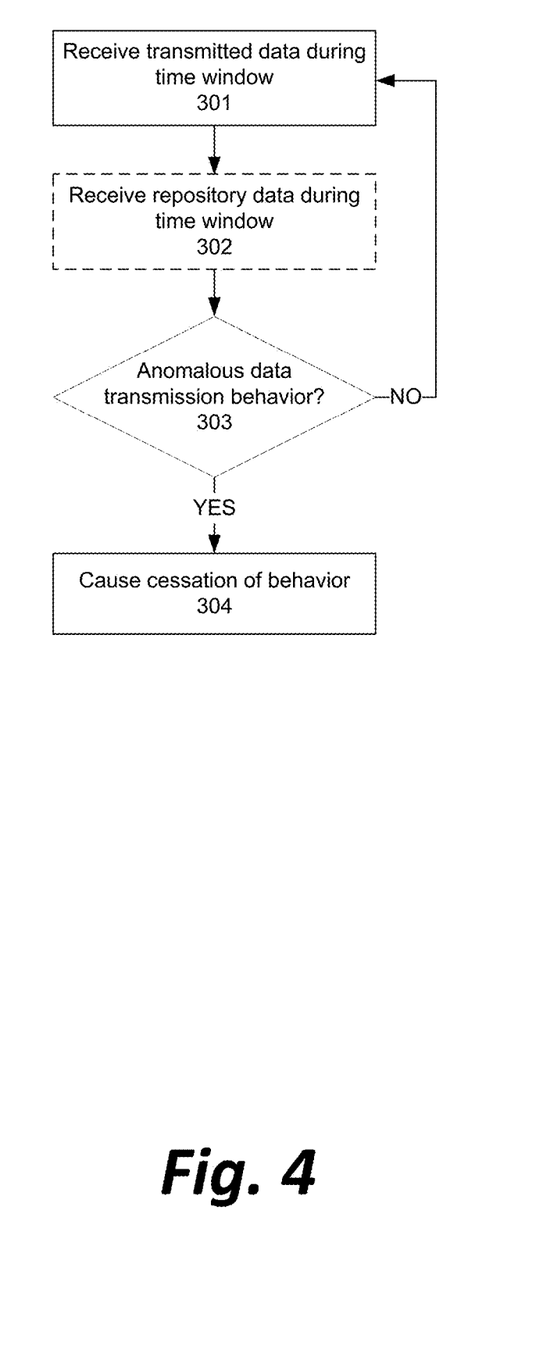
FIG. 4 illustrates, in simplified form, a preferred method of anomaly detection in the network illustrated in FIGS. 2 and 3.

FIG. 4 illustrates, in simplified form, a preferred method of anomaly detection in the networks illustrated in FIGS. 2 and 3.

With reference now to FIG. 4, the analytics engine 107 may receive from one or more packet capture nodes 106 all data, or a digest of all data, transmitted by a data router 102 over a given time window (Step 301). In some embodiments, the time window may be 10 milliseconds. In other embodiments, the time window may be shorter or longer, depending on the data application; in an application involving firewalling mission-critical websites, high-frequency trading, or aircraft navigation, for example, a window of less than 10 milliseconds may be preferred, while in less critical applications such as meteorology, a longer window such as one second or multiple seconds may be acceptable.

In some embodiments, the analytics engine 107 may optionally also receive all data, or a digest of all data, from the central repositories 104a-104n over the same given time window (Step 302).

The analytics engine may analyze the output data behavior over the time window, as well as, if present, the data from the central repositories, in order to determine whether an abnormality indicating a software, hardware, or network fault or failure has occurred in relation to the data router 102 (Step 303).

In some embodiments, the analysis may comprise determining a covariance between the data output from a specific data router 102 and data received from the central repositories 104a-104n. For example, a specific data router 102 acting as a stock order router may suddenly increase activity of a certain type or related to a certain asset tenfold and sustain the activity over a period of time, while the overall activity of a stock market remains essentially unchanged. In such a circumstance, the variance of behavior likely indicates some sort of fault in the orders being generated by the stock order router and forwarded to the exchanges. In another example, a specific data router 102 may forward data from meteorological sensors, and report a sudden increase in temperature or wind velocity from the sensors that is not reported by other routers and sensors in the same geographic area, indicating likely malfunction by the router rather than a localized hot spot or windstorm that was not forecast.

In some embodiments, the analysis may comprise determining that an abnormal data magnitude exists in the data output from a specific data router 102. For example, a specific data router 102 acting as a stock order router may begin offering to buy an asset at an abnormally high price given current sale offers and price history within a market. Abnormal price offers may indicate that a stock order router is either generating orders that were never requested by a human entity, or that a high level of network latency is causing orders that were reasonable when created not to be delivered until a point in time, minutes later, when the order would be unreasonable given a change in market conditions. In another example, a specific data router 102 aggregating and passing on data from voting machines in an election may report magnitudes of votes that far exceed historical voting data for a precinct or even exceed the number of registered voters in a precinct, indicating that data likely cannot be trusted and should be excluded from official results until a verification of voting machine integrity can be performed.

In some embodiments, the analysis may comprise determining that an abnormal data reporting rate exists in the data output from a specific data router 102. For example, a specific data router 102 acting as a stock order router may begin reporting a volume of trades during a given time window that vastly exceeds historical numbers of trades in similar windows. The change in volume may be indicative of buy or sell orders being generated by the stock order router that were never generated by any human intent, that were generated due to a software fault in an artificial intelligence system making trades, or that were generated as part of improperly "slicing" a large buy or sell order into multiple such orders that could be satisfied by smaller brokers. In another embodiment, a specific data router 102 acting as a firewall or load balancer for content servers might allow an unreasonably high number of HTTP requests to pass through, indicative of an attempted denial of service attack on the content servers that is not properly addressed at the firewall stage.

In some embodiments, the analysis may comprise determining that an abnormal fulfillment ratio exists in a set of two-way transactions being facilitated by a specific data router 102. For example, a specific data router 102 acting as a stock order router may generate new buy or sell orders at a rate much higher or much lower than the market generally satisfies the orders. If a stock order router begins generating so many buy or sell orders that fewer than 80% of generated orders are fulfilled over a given time window, or if it begins dropping in volume of buy or sell orders such that the number of fulfilled orders in a time window exceeds 120% of orders generated in that window, it may indicate a software fault generating unintended trade offers or an unacceptable level of network latency or other router error delaying forwarded orders. In another example, a specific data router 102 acting as a firewall or load balancer for content servers may continue allowing HTTP requests even though fewer than 80% of existing requests have been satisfied by the content servers. An imbalance of this magnitude may indicate that end-users are attempting a denial of service attack on the content routers by repeatedly requesting content without waiting to receive it, or that a network fault is causing the firewall not to receive an acknowledgment from the content server that the request has been received, and the load balancer is unnecessarily repeating the request.

If the analytics engine determines anomalous behavior by a data router 102, it may perform a preconfigured action to directly or indirectly cause the anomalous behavior to cease (Step 304). The action may be any one or more of: identifying a human user to be alerted of the anomaly, and generating an electronic message identifying the data router 102 to be delivered to a computing device (desktop computer, mobile phone, pager, etc.) or user account (email, texting account, social networking profile, etc.) associated with the user; completely shutting down the data router 102; partially limiting a scope of data transmissions allowed by data router 102 to only a subset of possible data types available to the data router 102 (e.g., limiting the ability of a stock order router to route buy or sell offers for particular assets; limiting a firewall from forwarding requests made by certain network addresses, etc.); limiting a set of data sources 101a-101n from which the data router 102 is permitted to receive data; limiting a set of central repositories 104a-104n to which the data router 102 is permitted to transmit data; causing an intermediary router 103 to filter out some or all data generated by data router 102 which is suspected of being incorrect; or causing the network to route around data router 102 and use other data routers to connect data sources 101a-101n and central repositories 104a-104n.

If no anomalous behavior is determined at data router 102, more transmitted data is received (Step 301) and the monitoring of the data router's behavior continues to be observed.

Figure 5:
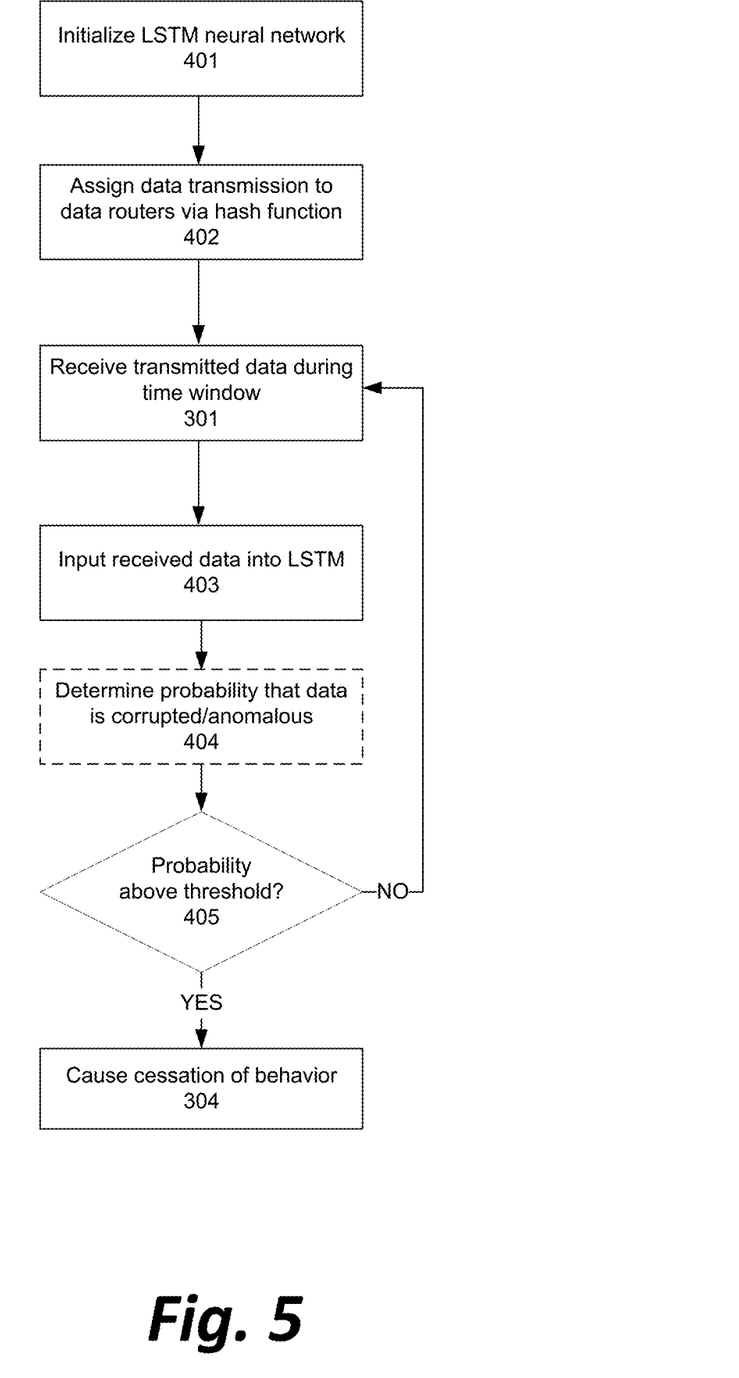
FIG. 5 illustrates, in simplified form, a refinement to the anomaly detection analysis in the method illustrated in FIG. 4.

FIG. 5 illustrates, in simplified form, a refinement to the anomaly detection analysis in the method illustrated in FIG. 4, with additional setup steps before receiving transmitted data (Step 301) and additional explanation of a possible analysis step (Step 303).

With reference now to FIG. 5, in a preferred embodiment, duties for processing data from data sources 101a-101n may be divided among multiple data routers 102a, 102b, etc. such that each data router 102 handles a defined subset of the total data transmissions by the data sources 101a-101n (Step 401).

In a preferred embodiment, a form of hash function is used to assign possible types, meanings, or significances of data transmission from the data sources 101a-101n to each of the data routers 102 (Step 402). For example, if the data routers 102 are stock order routers, the data routers could each be assigned a letter or group of letters, and process and forward only requests to buy or sell assets whose ticker symbols begin with that letter or group of letters. Similarly, if the data routers 102 are load balancers, the data routers could each be assigned a digit or set of digits and process requests only from IP (internet protocol) addresses that have those digits in particular positions, such as the least significant digits. In a third example, where the data routers 102 are routers of meteorological data, the data routers could be assigned weather stations based on a name of the station or a serial number assigned to each station.

In some embodiments, a more robust cryptographic-level hash function (for example, the value of the output of MD5 (message digest algorithm) or SHA (secure hash algorithm), modulus the number of data routers) could be used to virtually guarantee an even and unpredictably random distribution of duties between all data routers 102, but in all embodiments it is merely preferable that the function assign a value to a data type or data content that is substantially independent of the content itself, so that dissimilar data content is grouped together at each router.

Consequently, a statistically significant aberration in the data output of a particular data router 102 is very unlikely to be caused by an aberration in the underlying received data, because the data router 102 is processing only a subset of the overall routed data decided based on a sorting mechanism that is divorced from the underlying data itself. Any aberration in the true source data (such as a sudden increase in prices for stocks in a particular industry, or sudden change in weather at a particular location) should be equally distributed among multiple data routers and not reflected in the output from a single data router.

A long short-term memory (LSTM) neural network may be initialized in memory of the analytics engine 107 to assess and output a probability between 0.0 and 1.0 that data output by a particular data router 102 accurately represents that data router's input data, as opposed to an erroneously repeated output or otherwise corrupted output (Step 402).

Successive output by a given data router 102 over a series of time windows (as received in Step 301) may be fed into the LSTM neural network (Step 403).

After each time window, the LSTM neural network is used to determine and output a probability of corruption or other anomalous behavior (Step 404), and the analytics engine 107 determines whether the probability is above a predetermined threshold (Step 405). In addition to the factors that have been enumerated above for the analytics engine 107 to consider (i.e., covariance, magnitude, rate, and fulfillment ratio), an LSTM neural network allows for comparisons of a network node's present output to the node's own historical output to determine if an error may be causing the node to repeat output, to display a systematic bias in its output, or otherwise display a behavior that is abnormal primarily as a trend rather than as a specific data point.

In a preferred embodiment, the threshold may be set to 0.76. The threshold may be customized differently for different data applications and different risk-tolerances of an organization relying on quality data from the data routers. The threshold may be increased if the data router 102 appears to partially produce accurate data (such as normal prices and volumes of some, but not all stocks traded by the particular router, or normal temperatures and wind speeds for some, but not all of the stations forwarded by the particular router) or may be decreased if the significance of the data's application is particularly grave (such as an order router forwarding trades for abnormally large total amounts of money, or a meteorological router reporting perfectly safe conditions during what is already known to be an ongoing natural disaster such as a hurricane or wildfire).

If the probability or data corruption rises above the predetermined threshold and any situational upward or downward modifiers of the threshold, the analytics engine 107 may be triggered to indirectly or directly cease output by the data router 102 (Step 304). If the probability is not exceeded, a new time window of data is received (Step 301), input into the LSTM (Step 403), and the probability is updated (Step 404).

Figure 6:
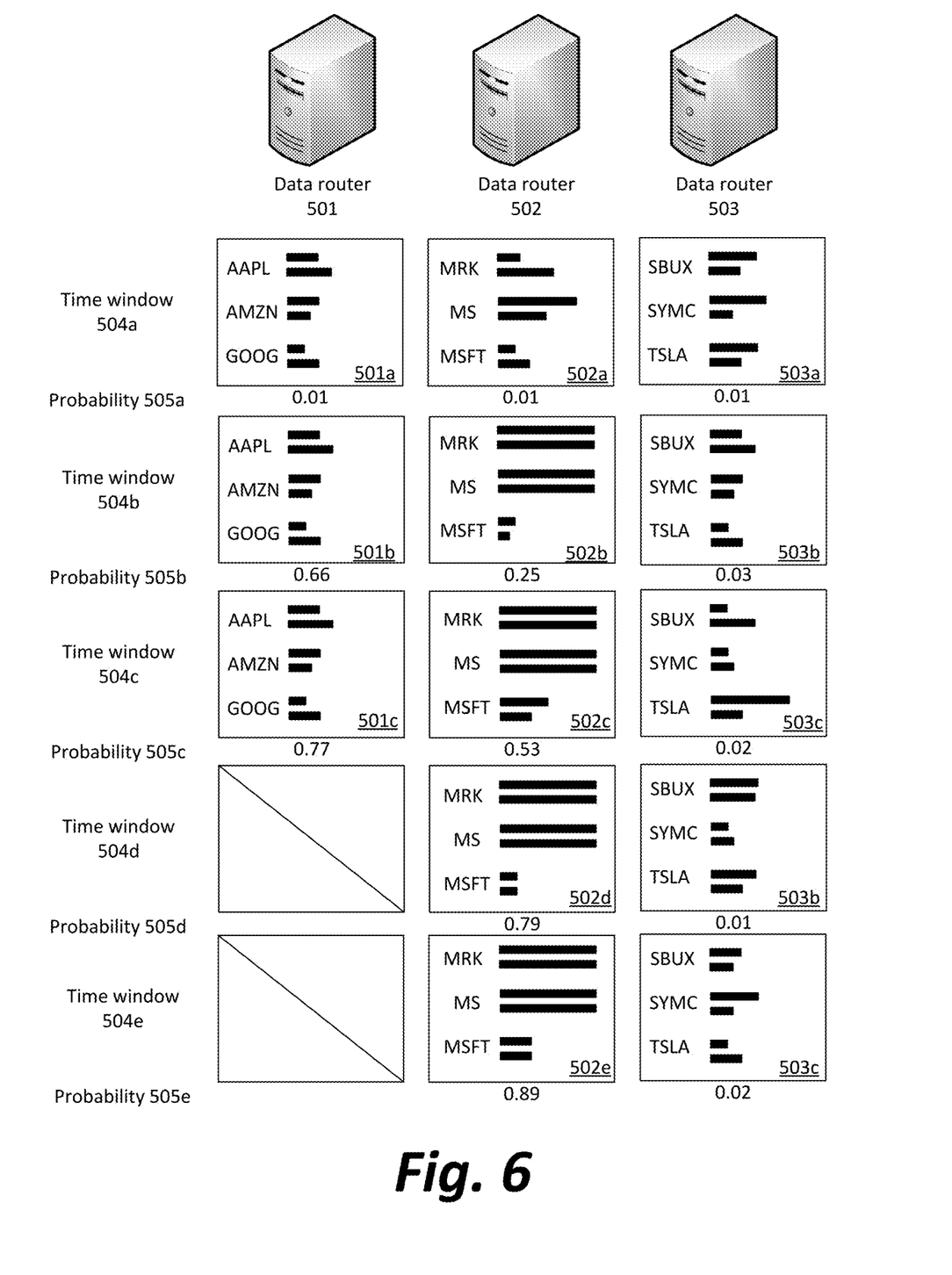
FIG. 6 illustrates an example operation of the method illustrated in FIGS. 4 and 5.

FIG. 6 illustrates an example operation of the method illustrated in FIGS. 4 and 5.

With reference now to FIG. 6, a set of order routers 501, 502, and 503 for asset sell and purchase orders in an asset market may be each assigned a subset of the alphabet, and process all stocks whose ticker symbols begin with the given letters of the subset. In the given example, order router 501 processes letters A-H, order router 502 processes I-Q, and order router 503 processes letters R-Z. Thus, as illustrated in the graphical representation of time windows 504*a*, 504*b*, 504*c*, 504*d*, and 504*e*, order router 501 would be designated to process orders for Apple (AAPL), order router 502 would be designated to process orders for Microsoft (MSFT), and order router 503 would be designated to process orders for Tesla (TSLA). The magnitude of the bars next to each stock symbol indicates an average price and total volume for a stock during a given time window.

At time 504*a*, all three routers display an essentially random distribution of stock volumes and prices. Accordingly, the order routers 501, 502, and 503 would each be assigned a very low probability 505*a* that data corruption is occurring and that any of the forwarded orders are spurious.

At time 504*b*, two statistically significant situations occur. First, the data output 501*b* is identical to the data output during 501*a*. Second, the data output 502*b* shows a sudden and marked increase in stock price and volume for two of its three stocks. The probabilities 505*b* are updated to reflect the LSTM's ability to determine that identically repeated data is extremely unlikely, and that an increase in asset price and volume is unlikely when not reflected in other segments of the market.

At time 504*c*, the data output 501*c* is again identical to previous outputs from order router 501. This results in a massive increase in the probability 505*c* that three identical outputs are caused by a node failure repeating its output rather than the actual underlying market situation. At this point in time, as the probability exceeds 0.76, the analytics engine acts to temporarily halt output from order router 501 until the cause of the error can be determined. Similarly, further increases in the probability that order router 502 is malfunctioning are noted due to the maintained abnormally high price and volume.

At time 504*d*, the probability 505*d* that order router 502 is outputting faulty data is determined by the LSTM neural network to be above 0.76. However, because at least one symbol (MSFT) being traded by order router 502 still appears to be behaving normally, the order router is "given the benefit of the doubt," so to speak, and the threshold for action is set to, for example, 0.80 instead.

At time 504*e*, the order router 502 is still producing abnormally high prices and volumes. Consequently, the probability 505*e* increases above even the more lenient threshold, and action is taken to address the apparent fault in that order router as well, or to minimize whatever fault may exist upstream and that is causing bad data to be sent to the order router.

Figure 7:
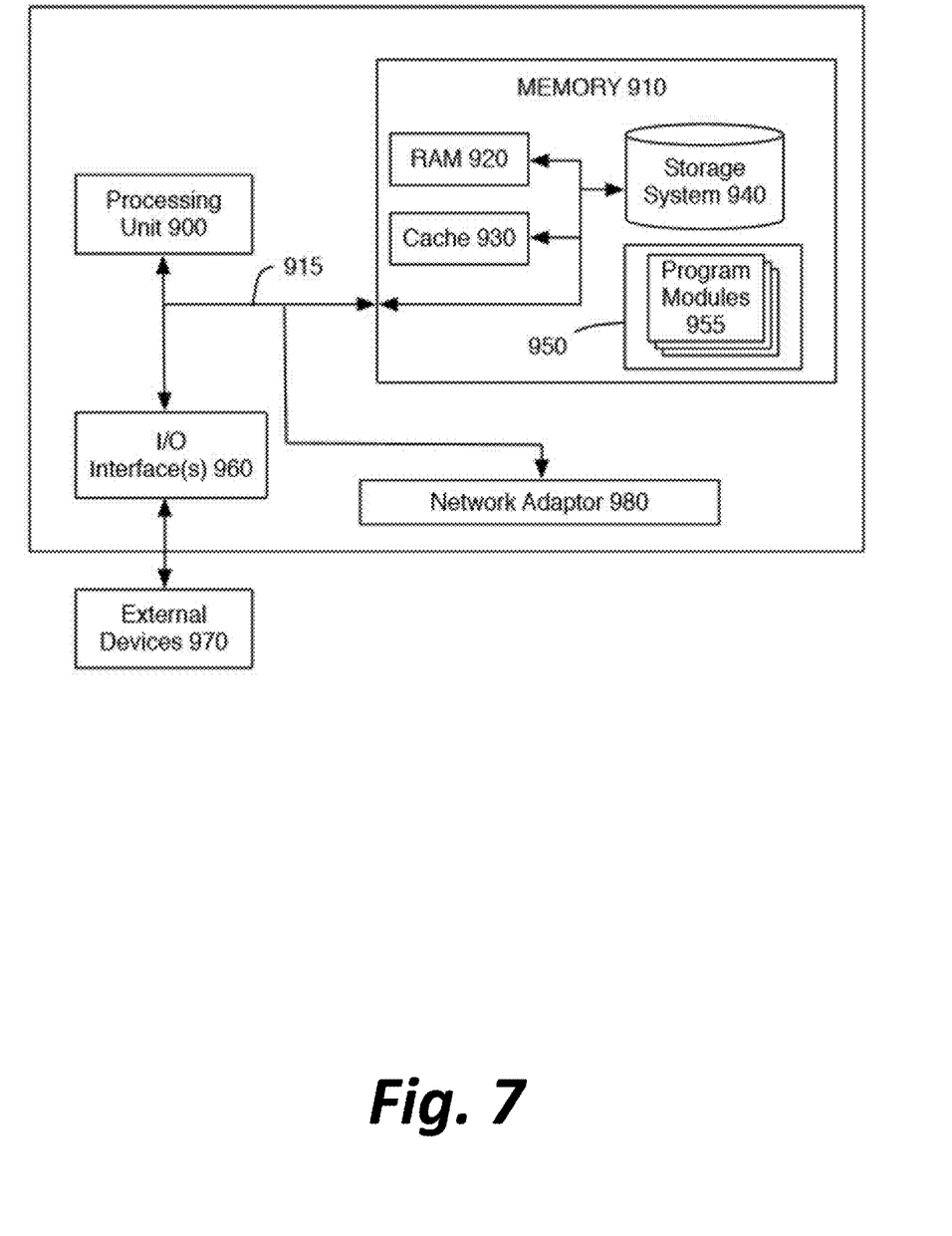
FIG. 7 is a block diagram of a representative computing device that may be utilized to implement various features and processes described herein.

FIG. 7 is a high-level block diagram of a representative computing device that may be utilized to implement various features and processes described herein, for example, the functionality of data origins 101*a*-101*n*, data routers 102*a*-102*n*, intermediate routers or network devices 103, interfaces of central repositories 104*a*-104*n*, data store 105, packet capture nodes 106*a*-106*n*, and/or analytics engine 107. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting a data router malfunction, comprising: one or more low-latency packet monitors, each associated with a data router that is configured to receive an input data stream and forward to a central repository an output data stream that is a copy of a selected subset of the input data stream, each of which is placed between its associated data router and the central repository along a network path, and each of which receives and forwards the output data stream to an analytics computing device; and the analytics computing device, storing electronic instructions that, when executed by a processor of the analytics computing device, cause the analytics computing device to: receive, from the one or more low-latency packet monitors, the forwarded output data stream over a series of time windows; feed data from the output data stream over the series of time windows into a long short-term memory (LSTM) neural network; using the LSTM neural network, determine a probability that the output data stream of a particular data router comprises a corruption of the input data stream due to software failure or hardware failure in the particular data router; and responsive to a determination that the probability exceeds a predetermined threshold, transmit an electronic message to the particular data router to cause a cessation of the output data stream corrupting the input data stream.

2. The system of claim 1, comprising two or more low-latency packet monitors each associated with one of two or more data routers, wherein packets of the input data stream comprise an identifier used to load balance between the two or more data routers in addition to underlying data, and wherein the selected subset of the input data stream is selected based at least in part on the identifier.

3. The system of claim 2, wherein the identifier is passed through a hash function to facilitate the load balancing.

4. The system of claim 2, wherein the selected subset of the input data stream is selected based at least in part on presence of a letter, number, or substring in the identifier.

5. The system of claim 1, wherein determining the probability that the output data stream comprises a corruption of the input data stream comprises determining that a statistically unlikely lack of variation exists in the output data stream given a predetermined expected variation in the output data stream.

6. The system of claim 1, wherein determining the probability that the output data stream comprises a corruption of the input data stream comprises determining that the particular data router is outputting data at a greater volume or with values at a greater magnitude than volumes or magnitudes observed during a previous period of comparison.

7. The system of claim 1, wherein determining the probability that the output data stream comprises a corruption of the input data stream comprises determining that the output data stream comprised a number of queries during a past time interval and that during a present time interval, a ratio of a number of new queries during the present time interval to a number of received responses to queries from the past time interval is not within a predetermined range.

8. The system of claim 1, wherein transmitting the electronic message to cause the cessation of the output data stream corrupting the input data stream comprises limiting a scope of data transmissions allowed by the particular data router.

9. The system of claim 1, wherein transmitting the electronic message to cause the cessation of the output data stream corrupting the input data stream comprises causing another data router to act on the selected subset of the input data stream instead of the particular data router.

10. The system of claim 1, wherein transmitting the electronic message to cause the cessation of the output data stream corrupting the input data stream comprises causing the particular data router to cease all outgoing transmissions.

11. A computer-implemented method for detecting a data router malfunction, comprising: receiving, by a computing device, from a low-latency packet monitor, and over a series of time windows, a copy of an output data stream from a data router that is configured to receive an input data stream and forward a selected subset of the input data stream as its output data stream; inputting, by the computing device and into a long short-term memory (LSTM) neural network, data received from the copy of the output data stream over the series of time windows; determining, by the computing device, after each time window, and using the LSTM neural network, a probability that received data from a present time window represents a corruption of the input data stream due to software failure or hardware failure in the data router; and responsive to determining that the probability exceeds a predetermined threshold, automatically transmitting an electronic message to the data router to modify output of the data router and prevent output of data by the data router that is not an accurate copy of data from the input data stream.

12. The method of claim 11, wherein packets of the input data stream comprise an identifier used to load balance between the data router and one or more other data routers in addition to underlying data, and wherein the selected subset of the input data stream is selected based at least in part on the identifier.

13. The method of claim 12, wherein the identifier is passed through a hash function to facilitate the load balancing.

14. The method of claim 12, wherein the selected subset of the input data stream is selected based at least in part on presence of a letter, number, or substring in the identifier.

15. The method of claim 11, wherein determining the probability that received data from the present time window represents a corruption of the input data stream comprises determining that a statistically unlikely lack of variation exists in the output data stream given a predetermined expected variation in the output data stream.

16. The method of claim 11, wherein determining the probability that received data from the present time window represents a corruption of the input data stream comprises determining that the particular data router is outputting data at a greater volume or with values at a greater magnitude than volumes or magnitudes observed during a previous period of comparison.

17. The method of claim 11, wherein determining the probability that received data from the present time window represents a corruption of the input data stream comprises determining that the output data stream comprised a set of queries during a past time interval and that during a present time interval, a ratio of a number of new queries during the present time interval to a number of received responses to queries from the past time interval is not within a predetermined range.

18. The method of claim 11, wherein transmitting the electronic message to modify the output of the data router comprises limiting a scope of data transmissions allowed by the data router.

19. The method of claim 11, wherein transmitting the electronic message to modify the output of the data router comprises causing another data router to act on the selected subset of the input data stream instead.

20. The method of claim 11, wherein transmitting the electronic message to modify the output of the data router comprises causing the data router to cease all outgoing transmissions.

* * * * *